Figure 1:
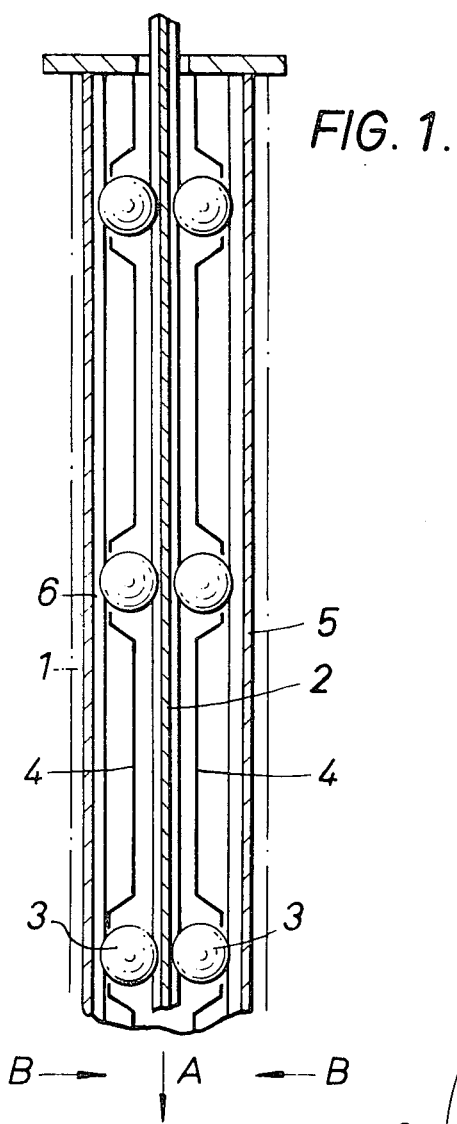

United States Patent

[11] 3,631,731

| [72] | Inventors | George Hawtree<br>Llanelly;<br>Edgar Hoyle, Swansea, both of Wales |
|---|---|---|
| [21] | Appl. No. | 25,556 |
| [22] | Filed | Apr. 3, 1970 |
| [45] | Patented | Jan. 4, 1972 |
| [73] | Assignee | Bowden Controls Limited<br>Llanelly, Wales |
| [32] | Priority | Apr. 3, 1969 |
| [33] | | Great Britain |
| [31] | | 17,624/69 |

[54] PUSH-PULL TRANSMISSIONS
5 Claims, 4 Drawing Figs.

[52] U.S. Cl.................................................. 74/501 R,
29/148.4 A, 308/6 R
[51] Int. Cl................................................. F16c 1/10
[50] Field of Search............................................ 74/501;
308/6, 6 B; 29/148.4 A

[56] References Cited
UNITED STATES PATENTS

| 3,258,990 | 7/1966 | Bratz............................ | 74/501 |
| 3,353,876 | 11/1967 | Moyer........................... | 308/6 B |
| 3,538,786 | 11/1970 | Coordes......................... | 74/501 |
| 3,521,341 | 7/1970 | Hornlein........................ | 29/148.4 A |
| 3,003,827 | 10/1961 | Hentschke..................... | 308/6 B |

*Primary Examiner*—William F. O'Dea
*Assistant Examiner*—P. D. Ferguson
*Attorney*—Cushman, Darby & Cushman

ABSTRACT: A push-pull transmission of the type in which a central strip is longitudinally displaceable between two rows of caged rolling elements, e.g., balls, arranged to roll on outer tracks in a conduit by longitudinal displacement of the strip, the feature being that the conduit is contracted after assembling the transmission to take up tolerances and ensure contact of the rolling elements with the strip and the outer tracks. Contraction may be such as to preload the balls, i.e., subject them to some radial pressure. The conduit may be contracted substantially uniformly over its whole length, such as progressively by rotary swaging.

PUSH-PULL TRANSMISSIONS

The present invention relates to push-pull transmissions of the type in which a central strip is longitudinally displaceable between two rows of caged rolling elements, e.g., balls, arranged to roll on outer tracks in a conduit usually of a flexible character. The outer tracks are generally formed by rails located within the conduit, the faces of the strip and the inner faces of the rails being grooved to accommodate segments of the balls.

These transmissions serve for push-pull control by longitudinal displacement of the inner strip aimed to displace the cages of balls through a longitudinal distance with is substantially one-half the displacement of the strip with the balls rolling on the tracks.

However, in assembling such transmissions it is inevitable that manufacturing tolerances must be allowed for and inherent clearances in the mechanism are encountered exacerbated by increase in the length of the transmission.

As a result there may not be effective rolling of the balls on the rails when the strip is displaced. The strip may therefore either slip or skid on the balls and in either case effective control is affected, the skidding action considerably increasing the frictional load as compared with the rolling friction load. Moreover if the transmission is installed in a vertical or inclined run and is subjected to vibration, the cages of balls tend to migrate towards the lower end of the transmission and can cause buckling of the cages or jamming thereof in the end fitting. The balls under such condition may be forced out of their cages and seizure of the control may occur.

Provision may be made to upset the ends of the ball cages so as to prevent jamming of an end of the cage in the end fitting where this provides a narrow guideway for the strip or such a guideway may be internally ribbed to lessen the liability of jamming by promoting a lessening of the clearance but these expedients will not prevent the longitudinal migration of the cages of balls before referred to.

For the smooth control of the transmission we aim to ensure substantially uniform effective rolling contact between the balls and the strip and the rails without undesirable migration of the cages of balls and to this end the present invention consists of a transmission of the kind described wherein the bore of the conduit has been contracted substantially along its whole length after assembly of the inner elements to ensure contact of the balls with the strip and rails, even if desired to such an extent that there is a radial preload on the balls between the strip and rails, i.e., the balls are under some radial pressure.

One way of achieving this is to swage the conduit externally after assembly within the conduit of the inner elements of the transmission, and a convenient way of doing this is by a progressive rotary swage, i.e., by delivering intermittent radial forces to the conduit by a rotating tool while the conduit is travelling axially, but any other suitable or conventional method of contracting the conduit may be employed.

By these means the whole series of balls of each cage can be maintained in uniform contact with or under uniform controlled pressure between the strip and the rails.

We have carried out tests with the transmission appropriately flexed to provide a vertically or downwardly inclined run by subjecting the strip to back and forward movement in the longitudinal direction with say 20 rapid half strokes in relation to the designed stroke and it was found that there was a considerable loss of rolling stroke length due to the ball cages migrating to the bottom end of the transmission.

After passing the assembled transmission through a rotary swager in successive passes, we were able to eliminate the rolling stroke loss.

Figure 2:
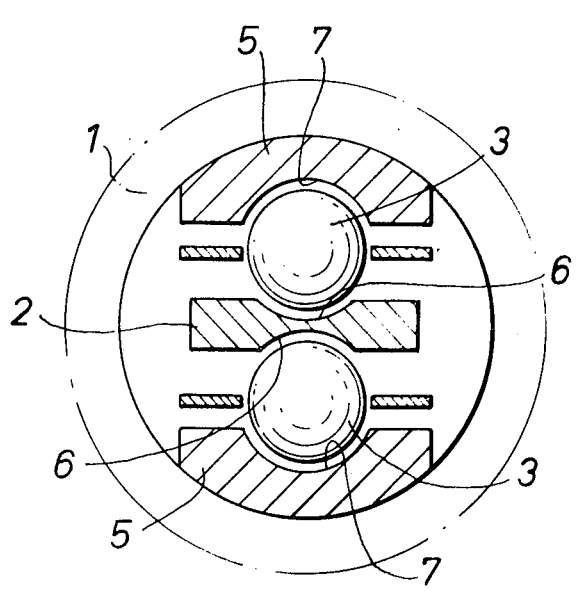
Figure 3:
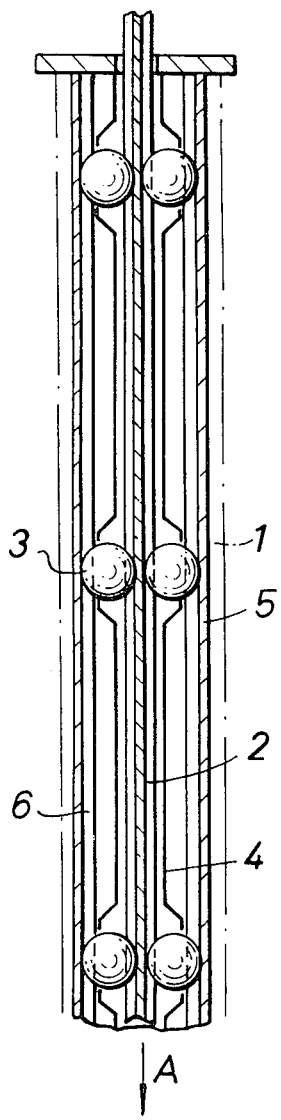
Figure 4:
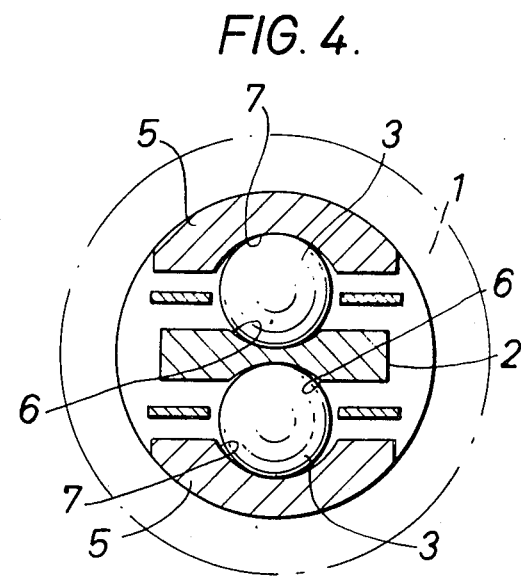

The type of transmission with which the invention is concerned is illustrated in the accompanying drawings, in which FIG. 1 is a sectional elevation and FIG. 2 is an enlarged cross section of the transmission indicating the components assembled and showing on an exaggerated scale the clearances which are normally present whereas FIGS. 3 and 4 are similar views but showing the contraction of the conduit after assembly to take up these clearances.

The transmission comprises a conduit 1, a central strip 2, two rows of balls 3 in cages 4, and outer tracks 5.

The central strip is longitudinally grooved on opposite sides at 6 and the outer tracks are each longitudinally grooved at 7.

The conduit is mounted at each end and the strip 2 is longitudinally displaceable with the aim of displacing the cages of balls as hereinbefore described. The strip is displaceable longitudinally in either direction. It is shown as ready to be displaced in the direction of the arrow A, the ball cages having freedom for limited longitudinal displacement depending on the operative limits of stroke of the strip.

When however the components of the transmission are fabricated with normal tolerances, effective contact is not obtained between the balls 3 and the strip 2 on the one hand and the outer tracks 5 on the other. The clearances are indicated on an exaggerated scale in FIGS. 1 and 2. This precludes efficient rolling contact between the balls and the strip and tracks and if the control be installed in vertical run, and especially when the control is subjected to vibration, the weight of the cages of balls may overcome gravity and migrate to the bottom of the control and thus preclude the efficient rolling action of the caged balls.

If, however, after assembly as shown in FIGS. 1 and 2, the conduit is progressively swaged as by means of rotary swaging indicated by the arrows B, the conduit 1 is contracted and throughout the length of the conduit contact between the balls 3 and the strip 2 and outer tracks 5 can be ensured. Swaging can be controlled to obtain a preload on the balls between the tracks and strip, and migration of the cages to the bottom end of the control, when this is permitted by the run of the control, and under any normal vibratory conditions to which the control is subjected, will not take place and thus in either direction of operation the caged balls will roll efficiently on the strip and the tracks.

The invention widens the field with regard to forms of conduit. Sealed stainless steel flexible tubing (similar to gas piping) may have wide tolerances as regards bore diameter of the conduit as such tolerances can be eliminated by rotary swaging, and swaging may also have the effect in some cases of sealing the conduit against ingress of foreign matter and moisture and of reducing lost motion in the control.

What is claimed is:

1. In a push-pull transmission having a central strip, plural rows of caged rolling elements supporting said strip on each side a conduit containing said strip and rolling elements, said conduit including tracks mounted on the inner surface thereof for engaging said rolling elements in rolling contact so that said strip is longitudinally displaceable between the rows of rolling elements, the improvement comprising that said conduit has been contracted after assembly of the transmission to ensure rolling contact of the rolling elements with the strip and the outer track.

2. A method of increasing the efficiency of a push-pull transmission of the type in which a central strip element is longitudinally displaceable between two rows of caged rolling elements arranged to roll on outer track elements within a conduit, which comprises the step of contracting the conduit around the said elements after they have been assembled in the conduit in order to ensure contact of all the rolling elements with the strip and track elements.

3. The method of increasing the efficiency of a push-pull transmission of the type in which a central strip is longitudinally displaceable between two rows of caged rolling elements arranged to roll on outer tracks in a conduit, in which, after assembly of the transmission, the conduit is externally swaged to ensure contact between the rolling elements and the strip and the tracks.

4. The method according to claim 3 in which the conduit is swaged substantially throughout its length surrounding the rolling elements by a progressive rotary swaging action.

5. The method according to claim 3 in which the conduit is swaged to produce a radial preload on the rolling elements.